May 9, 1967
S. J. BASCH
3,317,985
CUTTING TOOL HOLDER
Filed July 26, 1965
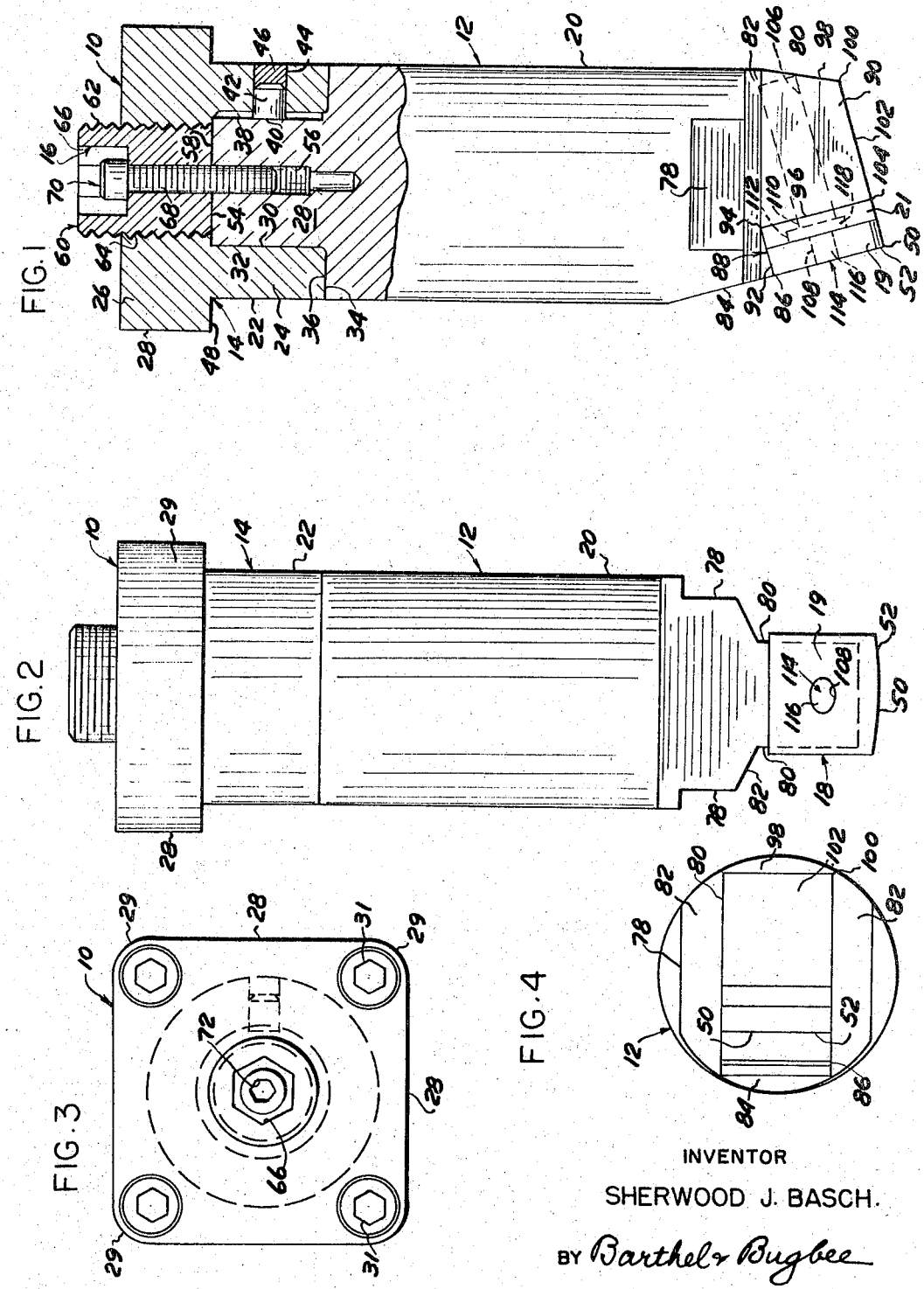
INVENTOR
SHERWOOD J. BASCH.
BY Barthel & Bugbee
ATTORNEYS

United States Patent Office 3,317,985
Patented May 9, 1967

3,317,985
CUTTING TOOL HOLDER
Sherwood J. Basch, Fruitport, Mich., assignor to Morton Manufacturing Company, Muskegon Heights, Mich., a corporation of Michigan
Filed July 26, 1965, Ser. No. 474,868
9 Claims. (Cl. 29—96)

This invention relates to tool holders and, in particular, to such tool holders for heavy duty draw or push cut machines, wherein the cutting tool in its tool holder is mounted in a reciprocatory ram while performing its cut.

One object of this invention is to provide a heavy duty draw- or push-cutting tool holder having an improved length adjustment whereby compensation is provided for wear and resharpening or replacement of the tool bit so as to maintain a constant length and consequently a predetermined depth of cut for a given adjustment of the machine.

Another object is to provide a heavy duty cutting tool holder of the foregoing character which has improved means therein for preventing rotation of the tool bit carrier within the base of the tool holder.

Another object is to provide a heavy duty cutting tool holder of the foregoing character wherein the cutting is facilitated by the provision of a transversely-curved tip on the cutting tool.

Other objects and advantages of the invention will become apparent during the course of the following description of the accompanying drawings, wherein:

FIGURE 1 is a side elevation, partly in section, of a heavy duty cutting tool holder with a cutting tool mounted therein;

FIGURE 2 is a front elevation of the cutting tool holder shown in FIGURE 1;

FIGURE 3 is a top plan view of the cutting tool holder shown in FIGURES 1 and 2; and FIGURE 4 is a bottom plan view of the cutting tool holder shown in FIGURE 1.

Referring to the drawing in detail, FIGURES 1, 2 and 3 show a heavy duty draw- or push-cut cutting tool holder, generally designated 10, according to one form of the invention as consisting generally of a cutting tool bit carrier 12 adjustably mounted in a flanged tool holder cap 14 by an adjustable locking device 16 and carrying at its lower end a cutting tool bit unit 18, including a tool bit 19, preferably of tantalum, tungsten or titanium carbide or the like, and a tool bit seat 21. Such carbide tool bits are well-known to those skilled in the cutting tool art and sold on the open market under various trade names, such as the well-known trade name "Carboloy" of the General Electric Company of Schenectady, N.Y. The tool holder 10 is used in a so-called draw- or push-cut machine, such as is shown, for example, in Morton Patent 2,781,698 of Feb. 19, 1957, for "Flash Trimming Machine" and would replace the cutting tool holders 78 and 80 thereof mounted in the vertical bores 74 and 76 of the lower and upper reciprocatory rams 64 and 66 of such a machine. The use of the present tool holder is, of course, not confined to this particular machine but it may be used in machines of this general type, with either a single ram or dual rams, as the case may be.

The tool bit carrier 12 and the tool holder cap 14 have outer cylindrical surfaces 20 and 22 respectively, which fit snugly in the tool-holder-receiving bore of the machine ram. The cylindrical surface 22 is located upon the reduced diameter portion 24 (FIGURE 1) of the cap 14 and above it is a square enlarged portion, head or flange 26 (FIGURE 3) having square sides 27 with rounded corners 29. The portion 28 fits into a rounded-corner square counterbore of the cutting machine ram. The flange 26 is bored near each of its four corners 29 to receive bolts or screws 31 by which it is secured to the ram.

The tool bit carrier 12 at its upper end is provided with a reduced diameter portion 28 with an outer cylindrical surface 30 which fits snugly into a corresponding cylindrical bore 32 in the reduced diameter portion 24 of the cap 14. The tool bit carrier 12 is provided with a flat annular shoulder 34 located between the cylindrical surfaces 20 and 30 and is adapted to abut the flat annular lower end surface 36 of the reduced diameter portion 24 of the cap 14. The reduced diameter portion 28 on one side is provided with an elongated flat-bottom longitudinal recess or groove 38 which is engaged by the flat inner end 40 of a projection in the form of a dowel pin 42 snugly mounted in a radial hole 44 in the reduced diameter portion 24 and secured therein as by welding with welding material 46. The dowel pin 42 acting in the groove 38 permits longitudinal sliding adjustment of the tool bit carrier 12 relatively to the cap 14 so as to maintain a constant predetermined distance between the flat annular shoulder 48 between the cylindrical surfaces 28 and 22 and the apex or center 50 of the edge 52 of the tool bit unit 18, as described more fully in connection with the operation of the invention.

The reduced diameter portion 28 of the tool bit carrier 12 is provided with a substantially flat radial upper end surface 54 and a central axial threaded bore 56. The former engages the correspondingly flat radial lower end surface 58 of the adjusting screw 60 having an externally-threaded outer surface 62 threaded into a correspondingly-threaded axial outer bore 64 in the enlarged diameter or flanged portion 26 of the cap 14. The adjusting screw 60 forms one unit of the adjustable locking device 16 and is provided with a hexagonal wrench socket 66 and a smooth inner axial bore 68 through which the threaded shank of a locking screw 70 with a hexagonal wrench socket 72 extends into the correspondingly-threaded axial inner bore 56 of the reduced diameter portion 28 of the tool bit carrier 21. The adjusting screw 60 and locking screw 70 are preferably of the so-called Allen type and are rotated by inserting the usual hexagonal Allen wrenches in their respective sockets 66 and 72.

The lower portion of the tool bit carrier 12 is provided with intermediate and lower parallel flattened portions 78 and 80 interconnected by sharply tapered portions 82 whereby the width of the tool bit carrier 12 is sharply reduced. At the same time, the front of the tool carrier 12 is cut away along a front surface 84 inclined downwardly toward the axis thereof to a corner edge 86 whence a tool bit socket 88 is formed in the lower end portion 90 lying between the parallel flattened portions 80. The tool bit socket 88 is in the form of a rabbet with an upper abutment surfaces 92 inclined upwardly and inwardly perpendicular to the surface 84 toward the axis of the tool bit carrier 12 to an inner corner edge 94 whence a rearward abutment surface 96 extends downwardly toward the axis of the tool bit carrier 12 substantially perpendicular to the upper surface 92 and therefore substantially parallel to a prolongation of the inclined front surface 84. The lower end portion 90 of the tool bit carrier 12 has a rearward flat surface 98 inclined downwardly toward the axis of the tool bit carrier 12 to a junction line or lower rearward edge 100 with a lower end surface 102. The latter extends downwardly to a junction with the surface 96 at a lower forward edge surface 104. The surface 102 is substantially perpendicular to the surface 96. The lower end portion of the tool bit carrier 12 is provided with a bore 106 having its axis perpendicular to the rearward abutment surface 96.

The rabbet-shaped tool bit socket 88 is of such depth and dimensions as to receive the carbide tool bit unit 18 substantially flush with the downwardly-inclined front surface 84 of the tool bit carrier 12. The tool bit unit 18 in turn is of the type manufactured and sold under the trade name "Carb-O-Lock" by the Metallurgical Products Department, Detroit, Mich., of the General Electric Company of Schenectady, N.Y. The tool bit seat 21 engages the rearward abutment surface 96 of the tool bit socket 88. The tool bit and the tool bit seat 21 of the tool bit unit 18 have aligned bores 108 and 110 respectively coaxial with the bore 106, and the tool bit seat 21 has a counterbore 112 also coaxial with the bores 106, 108 and 110. The tool bit seat 21 and tool bit 19 are locked in the socket 88 against the abutment surfaces 92 and 96 by a rotary locking device 114 consisting of a stepped cam shaft 116 snugly but rotatably mounted in the bores 106, 108 and 110 and provided with an eccentric cam 118 disposed within the counterbore 112. Rotation is accomplished by an Allen wrench in a hexagonal socket (not shown) in the rearward end of the cam shaft 116.

In the operation of the invention, let it be assumed that the tool bit unit 18 has been mounted in its socket 88 and clamped in position by rotating the rotary locking device. Let it also be assumed that the tool holder 10 has been mounted in a bore corresponding to the cylindrical surfaces 20 and 22 in the reciprocating ram of a draw or push-cut machine, such as is used for trimming flash off steel sheet plate, strip or coil stock. The operation of the machine causes the ram and the tool holder 10 to move back and forth, taking a cut off the adjacent surface of the work in one direction of stroke of the ram. The arcuate cutting edge 52 enables the operator to rotate the tool holder 10 without the necessity of making a tool height adjustment. Continued operation of the ram and continued cutting by the cutting edge 52 of the tool bit 19 of the tool bit unit 18 eventually causes dulling of the arcuate cutting edge 52, which in turn requires the provision of a new sharp cutting edge 52. This, however, ordinarily alters the distance between the shoulder 48 and the center or apex 50 of the cutting edge 52.

To make a tool-height adjustment restoring the cutting tool holder 10 to its previous condition with the same distance between the shoulder 48 in the cap 14 and the apex or center 50 of the cutting edge 52 which it previously possessed, the operator loosens the locking screw 70 by means of a suitable Allen wrench, then rotates the adjusting screw 60 to cause it to move upward or downward, as the case may be, until the apex or center 50 of the cutting edge 52 lies again at the desired distance from the shoulder 48, whereupon he retightens the locking screw 70 by means of the Allen wrench, thereby locking the tool carrier 12 and cap 14 in their re-adjusted positions. Cutting is then resumed in the usual way. The flattened portions 78 provide clearance for the trimmer clamp jaws (not shown) of the machine in which the tool holder 10 is mounted.

What I claim is:
1. A cutting tool holder, comprising
   a tool holder cap member,
   a tool bit carrier disposed coaxial with said tool holder cap member,
   one of said members having an axial bore therein and the other member having an axial prolongation axially slidably engaging said bore,
   said cap member having a threaded outer bore therethrough,
   an adjusting screw threaded through said threaded outer bore into abutting engagement with said prolongation,
   said adjusting screw having a smooth inner bore therethrough and said carrier member having a threaded inner bore coaxial with said smooth bore,
   a locking screw rotatably mounted in said smooth bore and extending therethrough into threaded engagement with said threaded inner bore,
   and means on said tool bit carrier member for securing a cutting tool bit thereto.
2. A cutting tool holder, according to claim 1, wherein means is provided for preventing relative rotation between said members while permitting relative axial sliding therebetween.
3. A cutting tool holder, according to claim 2, wherein said means comprises an elongated longitudinal recess in one of said member and a projection secured to the other of said members and extending into said recess.
4. A cutting tool holder, according to claim 3, wherein said other member has a transverse hole therein and wherein said projection includes a pin mounted in said hole with its inner end engaging said recess.
5. A cutting tool holder, according to claim 1, wherein a tool bit with a transversely-curved cutting edge thereon is secured by said means to said tool bit carrier.
6. A cutting tool holder, according to claim 1, wherein said tool cap member and said tool bit carrier member have substantially cylindrical external surfaces disposed substantially coextensive with one another.
7. A cutting tool holder, according to claim 6, wherein said tool cap member has an enlarged head disposed above its respective cylindrical external surface.
8. A cutting tool holder, according to claim 7, wherein said head includes means for securing said cap member to a cutting machine.
9. A cutting tool holder, according to claim 1, wherein said axial bore is disposed in said cap member and wherein said prolongation is disposed on said tool bit carrier member.

References Cited by the Examiner
UNITED STATES PATENTS
2,125,005   7/1938   Jearum _____ 29—96

WILLIAM W. DYER, Jr., *Primary Examiner.*

HARRISON L. HINSON, *Examiner.*